United States Patent Office 2,789,131
Patented Apr. 16, 1957

2,789,131

SYNTHESIS OF VITAMIN A

William Oroshnik, Plainfield, N. J., assignor to Ortho Pharmaceutical Corporation, a corporation of New Jersey No Drawing. Application April 22, 1953,
Serial No. 350,499

4 Claims. (Cl. 260—491)

This invention relates to compositions of matter and to methods for preparing the same. This invention particularly relates to compounds which are derivatives of α-ethynyl-β-ionol and to methods of preparing the said derivatives.

It is an object of this invention to prepare compounds to be used as intermediates in the preparation of compounds having vitamin A activity.

It is an object of this invention to prepare compounds having the same number of carbon atoms and the same configuration with respect to carbon atoms as vitamin A ethers or esters.

It is another object of this invention to prepare hydroxy compounds having the same number of carbon atoms and the same configuration with respect to carbon atoms as vitamin A ethers or esters.

It is another and further object of this invention to prepare compounds having the same number of carbon atoms and the same configuration with respect to carbon atoms as vitamin A ethers and the same number of hydrogen atoms as vitamin A ethers.

It is another object of this invention to prepare vitamin A ethers and esters.

Other objects of this invention will be apparent from the description following and from the appended claims.

In the "Journal of the American Chemical Society," volume 67, page 1627 (1945), the inventor disclosed that certain derivatives of α-ethynyl-β-ionol have value as intermediates in the preparation of synthetic compounds having vitamin A activity. This publication disclosed that a compound having the following formula

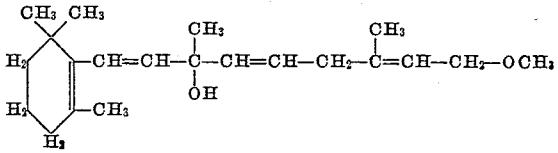

could be prepared by catalytic reduction of an acetylenic compound prepared by reacting α-ethynyl-β-ionol with a Grignard reagent and an ether of a 1,4 chlorohydrin of isoprene according to the following equation:

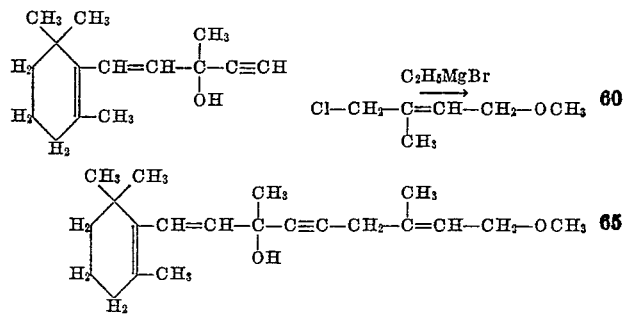

The acetylenic compound could not be distilled without dehydration because of impurities which were present. The reduction product of the acetylenic compound could be converted to a compound having vitamin A activity by a simultaneous rearrangement and dehydration.

It has now been discovered that vitamin A ethers and esters may be prepared from a compound having the formula

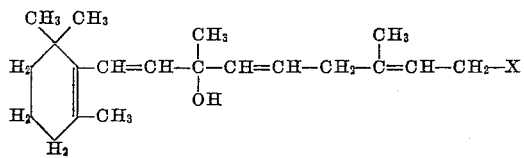

Compound I wherein X is —OR or

and R is a lower alkyl radical.

The preparation and properties of Compound I are given by William Oroshnik, G. Karmas and A. D. Mebane, "Journal of the American Chemical Society," volume 74, page 295 (1952).

In the practice of this invention Compound I is allylically rearranged and dehydrated by treatment with an acidic reagent such as an alkyl or aryl acid chloride in an organic base and specifically benzoyl chloride in pyridine and acetyl chloride in dimethylaniline, glacial acetic acid, glacial acetic acid and potassium acetate, and aqueous acetic acid; rearrangement and dehydration with the above reagents being accomplished at room temperature. Other reagents found suitable include para-toluene sulfonic acid in benzene, oxalic acid in benzene, glacial acetic acid in benzene, catalytic quantities of iodine in benzene, and phenyl isocyanate in benzene; rearrangement and dehydration with these reagents being accomplished at the boiling temperature of benzene. When X in Compound I is —OR, the rearrangement and dehydration may be accomplished by heating in the presence of excess Grignard reagent in benzene at the boiling point of benzene or in a mixture of xylene and ether at a temperature of 55° C. to 60° C. The product of the isomerization has the formula

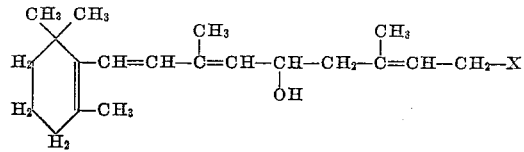

Compound II in which X has the same significance as above, and dehydration of Compound II produces vitamin A ether or ester.

The following examples are given merely to illustrate specific ways in which the invention may be practiced, and it is to be understood that the invention is not to be restricted or limited thereby.

EXAMPLE I

*Rearrangement and dehydration of Compound I (methoxy) with para-toluene sulfonic acid monohydrate*

Ten grams of distilled Compound I (methoxy) were dissolved in 50 cc. of glacial acetic acid at room temperature. To this solution was added .05 gram of para-toluene sulfonic acid monohydrate which acts as a catalyst to bring about allylic rearrangement and dehydration of the side chain to convert Compound I (methoxy) to vitamin A methyl ether. The solution immediately began to darken upon the addition of the catalyst, and after standing for four to six hours at room temperature and in the absence of light, the color of the solution was a very dark brown. At the end of this time, the solution was poured into a large volume of water and the oil precipitated out and was taken up with ether to form a layer above the water.

This ether solution was removed, washed thoroughly with water and finally with sodium bicarbonate solution, dried with anhydrous potassium carbonate and filtered. The filtrate was recovered, concentrated at room temperature under vacuum, and the concentrate then distilled under a high vacuum between .001 and .0001 mm. of mercury pressure; three fractions were separated and collected. One fraction distilled at 60° C. to 95° C. at 0.001 mm. of mercury pressure and measured 0.3 gram; a second fraction distilled at 100° C. to 103° C. at 0.001 mm. of mercury pressure and measured 5.6 grams and had an index of refraction at 26° C. of 1.5640. This amount of the said second fraction represents 56% of the theoretical yield. The ultraviolet spectrum of this second fraction showed an absorption band with a maximum at 3120 A. and had a molecular coefficient of extinction at this wavelength of 27,450. The calculated value of vitamin A methyl ether for carbon=83.94%, found=83.74%; calculated value for hydrogen=10.74%, found=10.59%. A third fraction distilled at 110° C. to 115° C. at .001 mm. of mercury pressure and had an index of refraction at 26° C. of 1.5771, and the ultraviolet spectrum of this fraction showed an absorption band with a maximum at 3150 A. and a molecular coefficient of extinction at this wavelength of 33,750. The yield of this fraction was 2.2 grams, which represents 22% of the theoretical yield. Analysis for carbon showed 83.79%, and analysis for hydrogen showed 10.69%; the theoretical values are, carbon 83.94% and hydrogen 10.76%. Fractions two and three are considered to be stereoisomers or mixtures thereof, and each showed the same growth-promoting properties in vitamin A deficient animals as does natural vitamin A. These two compounds were golden yellow liquids.

EXAMPLE II

*Rearrangement and dehydration of Compound I (acetoxy) with para-toluene sulfonic acid*

20.3 grams of Compound I (acetoxy) were dissolved in 100 cc. of glacial acetic acid containing one-tenth of a gram of para-toluene sulfonic acid and allowed to stand under nitrogen at room temperature for several hours. At this time the mixture had turned from an orange-red color to a dark brown color. It was then allowed to stand an additional twelve hours under nitrogen at room temperature. The solution was then poured into a large volume of water, the precipitated oil was taken up in ether, the ether solution was washed thoroughly with water and finally with sodium bicarbonate solution and eventually dried over anhydrous potassium carbonate.

After filtering and distilling off the ether under vacuum, the residue was distilled at .001 mm. of mercury pressure. There were obtained 2.9 grams of the compound boiling at 113° C. to 128° C. which had a refractive index at 25° C. of 1.5662, and 13.4 grams of the compound boiling at 128° C. to 130° C. which had a refractive index at 25° C. of 1.5805. Both these fractions have the same biological activity as natural vitamin A when fed to vitamin A depleted rats.

This application is a continuation-in-part of my U. S. patent application Serial No. 777,862, filed October 3, 1947, now U. S. Patent No. 2,674,621.

What is claimed is:

1. A method for dehydrating a compound having the formula

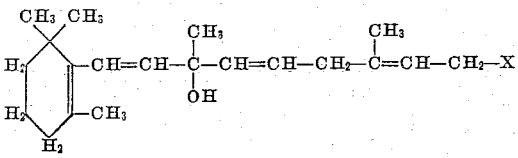

in which X is selected from the group consisting of —OR and

and R is a lower alkyl radical, which comprises treating the compound with an acidic reagent selected from the group consisting of alkyl and aryl acids and acid chlorides.

2. A method according to claim 1 in which the dehydration is accomplished in the presence of an organic base.

3. A method according to claim 1 in which dehydration is accomplished in the presence of para-toluene sulfonic acid in benzene.

4. A method according to claim 1 in which dehydration is accomplished in the presence of acetic acid.

References Cited in the file of this patent

UNITED STATES PATENTS

| | | |
|---|---|---|
| 2,529,498 | Isler | Nov. 14, 1950 |
| 2,574,484 | Karmas | Nov. 13, 1951 |

OTHER REFERENCES

Oroshnik: Jour. Amer. Chem. Soc., vol. 67, September 1945, pp. 1627–1628.

Oroshnik et al.: Jour. Amer. Chem. Soc., vol. 74, January 20, 1952, pp. 295 to 304.